UNITED STATES PATENT OFFICE 2,517,685

PREPARATION OF KETONES BY CATALYTIC REACTION OF DIOLEFINS WITH ALDEHYDES

Elbert C. Ladd, Passaic, N. J., assignor to United States Rubber Company, New York, N. Y., a corporation of New Jersey No Drawing. Application March 13, 1947, Serial No. 734,539

2 Claims. (Cl. 260—597)

This invention relates to improvements in the preparation of ketones.

It is known that conjugated dienes are readily homopolymerizable in the presence of ultraviolet light or peroxygen type catalysts to form high molecular weight rubber-like polymers. I have found that conjugated diene hydrocarbons will react with certain aldehydes, in the presence of ultraviolet light or materials which will decompose to give free radicals, to form well defined ketones.

According to the present invention, conjugated diene hydrocarbons are reacted with certain functionally aliphatic aldehydes, namely, n-alkanals, sec-alkanals, cycloalkanecarboxaldehydes and aralkanals in the presence of ultaviolet light or a catalytic material which will decompose to give free radicals, to form ketones of the formula $R-CO-(X)_n-H$, where R is the n-alkyl, sec-alkyl, cycloalkyl or aralkyl radical of the aldehyde reactant and X is the divalent radical derived from the conjugated diene, and $n$ is an integer from 1 to 9.

The process of my invention is carried out by reacting a mixture of the aldehyde and the conjugated diene hydrocarbon, in the presence or absence of an inert diluent, such as n-hexane, cyclohexane or benzene, under free radical conditions, that is, in the presence of a source of free radicals, e. g., ultraviolet light or a catalyst which will decompose to give free radicals, the temperature employed being sufficient to effect decomposition of any such catalytic material with consequent production of free radicals. Examples of the aldehydes suitable for the process of my invention are acetaldehyde, propionaldehyde, butyraldehyde, isobutyraldehyde, heptaldehyde, octaldehyde, cyclopentanecarboxaldehyde, cyclohexanecarboxaldehyde, phenylacetaldehyde. Examples of the conjugated diene hydrocarbon are the butadiene-1,3 hydrocarbons, such as butadiene-1,3, 2-methyl-butadiene-1,3 (isoprene), 2,3-dimethyl butadiene-1,3, piperylene. Examples of catalysts suitable for the process of my invention which will decompose to give free radicals are peroxygen-type catalysts, viz: organic peroxides, e. g., acyl peroxides such as diacetyl peroxide, dibenzoyl peroxide, acetyl benzoyl peroxide, and alkyl peroxides such as tertiarybutyl hydroperoxide; hydrogen peroxide; per-salts, e. g., alkali persulfates, alkali perborates, alkali percarbonates; hydrazine derivatives, e. g., hydrazine sulfate, hydrazine hydrochloride, dibenzoyl hydrazine; organometallic compound which decomposes thermally to give free radicals, e. g., tetraethyl-lead. The type of catalysts exemplified above which will decompose to give free radicals are well known and should not be confused with Friedel-Crafts type catalysts, such as aluminum chloride, boron trifluoride, and acids such as sulfuric and hydrofluoric acids, which are not effective in the present process to give the liquid low molecular weight ketones of the present invention. Conversely, as known, the catalysts used in the process of the present invention are not effective as catalysts in Friedel-Crafts reactions. The organic peroxides are the present preferred catalysts for the process of the present invention.

The amounts of the aldehyde and conjugated diene reactants may be varied over a considerable range, it being preferable to employ 1 to 20 mols of aldehyde per mol of conjugated diene, the higher molar ratios being particularly useful in securing the optimum yield of low molecular weight ketones. Where it is inconvenient or impractical to employ a large excess of the aldehyde, the conjugated diene may be added incrementally to the reaction mixture, thus in effect maintaining a considerable excess of the aldehyde throughout the major portion of the reaction. The catalyst may be ultraviolet light or a catalytic material, as described above, which will decompose to give free radicals, in which latter case the amount of catalyst employed is not critical, generally an amount of such catalytic material from 0.5 to 15 mol percent of the conjugated diene being satisfactory. The temperature of the reaction may vary over a wide range depending particularly on the catalyst used, which must be decomposed under the reaction conditions to produce free radicals. For practical purposes, reaction temperatures of about 25° C. to 150° C., preferably in the range of 65° C. to 100° C., particularly for organic peroxide catalysts, have proven satisfactory. With liquid conjugated diene reactants, atmospheric pressure is satisfactory, while elevated pressures up to 2000 lbs. per square inch or more are preferred with conjugated dienes which are gaseous at room temperature (25° C.) and atmospheric pressure. The reaction is carried out until a substantial amount of the reactants has been converted to the ketone products. While the length of time the reaction is allowed to proceed naturally depends on various factors, such as the temperatures and pressures used, the reactants and catalysts employed, and the acceptable yield of ketone produced, generally the time of reaction may be from 1 to 50 or more hours. The ketone products may be isolated from the reaction mixture by removal of the unreacted starting materials and fractional distillation of the residue. In the case of the very high boiling products, however, fractional crystallization of the residue may prove to be more convenient.

The following example is illustrative of the invention:

To a solution of 13.6 parts by weight of dibenzoyl peroxide in 720 parts by weight of n-butyraldehyde at 80–85° C. were added 68 parts by weight of isoprene dropwise in the course of 20 hours. The reaction mixture was then heated for an additional 11 hours, after which it was cooled, washed with aqueous sodium bicarbonate solution, and dried. Upon distillation, 6.8 parts by weight of isopentenyl propyl ketone were obtained. Boiling point, 70–74° C./2 mm.; $n_D^{20}=1.4578$. The identity of the ketone was confirmed by the 2,4-dinitrophenyl hydrazone derivative which melted at 119.5–120.5° C. Analysis.—found: N, 17.98%; theory: N, 17.49%. The isopentenyl propyl ketone corresponded to a ketone of the formula R—CO—(X)$_n$—H, where R is the n-alkyl radical of the aldehyde, X is the divalent radical derived from the isoprene, and n is 1.

In view of the many changes and modifications that may be made without departing from the principles underlying the invention, reference should be made to the appended claims for an understanding of the protection afforded the invention.

Having thus described my invention, what I claim and desire to protect by Letters Patent is:

1. The process of making isopentenyl propyl ketone which consists in heating n-butyraldehyde with isoprene in proportions ranging from 1 to 20 mols of n-butyraldehyde per mol of isoprene in the presence of dibenzoyl peroxide at a temperature of from 65° C. to 100° C., until isopentenyl propyl ketone is formed, and isolating said isopentenyl propyl ketone.

2. The process of making isopentenyl propyl ketone which consists in adding isoprene incrementally to a mixture of n-butyraldehyde and dibenzoyl peroxide over a period of approximately 20 hours, the n-butyraldehyde being employed in an amount corresponding to approximately 10 mols per mol of isoprene, maintaining the mixture at 80–85° C. during and for approximately 11 hours subsequent to the addition to effect reaction, and recovering isopentenyl propyl ketone from the resulting reaction mixture.

ELBERT C. LADD.

REFERENCES CITED

The following references are of record in the file of this patent:

UNITED STATES PATENTS

| Number | Name | Date |
| --- | --- | --- |
| 1,953,486 | Elbert et al. | Apr. 3, 1934 |
| 2,386,735 | Borders et al. | Oct. 9, 1945 |
| 2,388,167 | Marple | Oct. 30, 1945 |
| 2,391,218 | Bacon et al. | Dec. 18, 1945 |
| 2,397,205 | Rummelsburg | Mar. 26, 1946 |
| 2,423,497 | Harmon | July 8, 1947 |
| 2,434,313 | Dreyfus | Jan. 13, 1948 |
| 2,440,800 | Hanford et al. | May 4, 1948 |